United States Patent
Zhang et al.

(10) Patent No.: US 12,457,535 B2
(45) Date of Patent: Oct. 28, 2025

(54) CONNECTION METHOD AND APPARATUS FOR WIRELESS SMART WEARABLE DEVICE AND STORAGE MEDIUM

(71) Applicant: Beijing Xiaomi Mobile Software Co., Ltd., Beijing (CN)

(72) Inventors: Yu Zhang, Beijing (CN); Kun Niu, Beijing (CN); Yong Chen, Beijing (CN); Lei Zhang, Beijing (CN); Shiding Qiu, Beijing (CN); Kaidi Wang, Beijing (CN); Xiaofei Jing, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 421 days.

(21) Appl. No.: 18/060,245

(22) Filed: Nov. 30, 2022

(65) Prior Publication Data
US 2024/0056921 A1 Feb. 15, 2024

(30) Foreign Application Priority Data
Aug. 9, 2022 (CN) .......................... 202210948640.X (51) Int. Cl.
*H04W 36/00* (2009.01)
*H04W 76/14* (2018.01)
(52) U.S. Cl.
CPC ........... *H04W 36/03* (2018.08); *H04W 76/14* (2018.02)
(58) Field of Classification Search
CPC .............................. H04W 36/03; H04W 76/14

USPC .......................................................... 370/331
See application file for complete search history.

(56) References Cited

U.S. PATENT DOCUMENTS

| | | | |
|---|---|---|---|
| 10,630,828 B2 * | 4/2020 | Park | H04W 12/06 |
| 10,674,410 B2 * | 6/2020 | Wang | H04W 36/0016 |
| 11,310,848 B2 * | 4/2022 | Chen | G06F 3/01 |
| 11,375,569 B2 * | 6/2022 | Chae | H04W 76/18 |
| 11,451,946 B2 * | 9/2022 | Zhao | H04W 76/14 |
| 11,546,951 B1 * | 1/2023 | Siminoff | H04N 7/186 |
| 11,690,122 B2 * | 6/2023 | Chen | H04W 74/08 |
| | | | 370/331 |
| 11,844,119 B2 * | 12/2023 | Zhu | G06F 3/0488 |
| 11,889,570 B1 * | 1/2024 | Naik | H04W 76/14 |
| 11,930,542 B2 * | 3/2024 | Lee | H04W 76/38 |
| 12,028,914 B2 * | 7/2024 | Chen | H04W 4/18 |
| 12,052,778 B2 * | 7/2024 | Meiyappan | H04W 4/029 |
| 12,069,551 B2 * | 8/2024 | Liu | H04W 12/50 |
| 12,075,499 B2 * | 8/2024 | Ni | H04W 76/14 |

(Continued)

FOREIGN PATENT DOCUMENTS

| | | | |
|---|---|---|---|
| JP | 2024528238 A | * | 7/2024 |
| WO | 2021129529 A1 | | 7/2021 |

(Continued)

*Primary Examiner* — Melvin H Pollack
(74) *Attorney, Agent, or Firm* — McCoy Russell LLP (57) ABSTRACT

A connection method for a wireless smart wearable device is performed by a terminal device, and includes: receiving a connection switching instruction of the wireless smart wearable device from a preset control interface of the terminal device; determining a target device according to the connection switching instruction; and instructing, according to a preset parameter of the wireless smart wearable device, the target device to be connected with the wireless smart wearable device according to the preset parameter.

20 Claims, 9 Drawing Sheets

(56) References Cited

U.S. PATENT DOCUMENTS

| | | | |
|---|---|---|---|
| 12,082,276 B1* | 9/2024 | Guild | H04L 9/3247 |
| 12,105,787 B1* | 10/2024 | Hanson | H04B 1/385 |
| 12,150,197 B2* | 11/2024 | Yang | H04W 76/27 |
| 12,213,045 B2* | 1/2025 | Arvidson | H04W 76/14 |
| 2013/0237267 A1* | 9/2013 | Lee | H04W 76/10 |
| | | | 455/509 |
| 2015/0334673 A1* | 11/2015 | Mathias | H04W 76/18 |
| | | | 455/426.1 |
| 2016/0088678 A1* | 3/2016 | Sridharan | H04W 76/27 |
| | | | 455/452.1 |
| 2017/0289739 A1 | 10/2017 | Trip et al. | |
| 2020/0128620 A1 | 4/2020 | Han et al. | |
| 2021/0368049 A1* | 11/2021 | Kubota | H04N 1/00307 |
| 2022/0232653 A1* | 7/2022 | Zhang | H04W 76/34 |
| 2022/0335818 A1* | 10/2022 | Choi | H04Q 9/04 |
| 2023/0171833 A1* | 6/2023 | Haggai | H04W 76/18 |
| | | | 455/41.2 |
| 2023/0337300 A1* | 10/2023 | Chen | H04W 76/14 |
| 2023/0379683 A1* | 11/2023 | Roberts | H04W 76/14 |
| 2023/0397268 A1* | 12/2023 | Hanif | H04W 24/04 |
| 2024/0031136 A1* | 1/2024 | Narula | H04L 9/0833 |
| 2024/0049116 A1* | 2/2024 | Choi | H04W 8/005 |
| 2024/0414785 A1* | 12/2024 | Liang | H04L 63/205 |

FOREIGN PATENT DOCUMENTS

| | | | | |
|---|---|---|---|---|
| WO | 2022055415 A1 | 3/2022 | | |
| WO | WO-2023055279 A1 * | 4/2023 | | H04W 36/0022 |

\* cited by examiner

CONNECTION METHOD AND APPARATUS FOR WIRELESS SMART WEARABLE DEVICE AND STORAGE MEDIUM

CROSS REFERENCE TO RELATED APPLICATIONS

The present application claims priority to Chinese Patent Application No. 202210948640.X, filed on Aug. 9, 2022. The entire contents of the above-listed application is hereby incorporated by reference for all purposes.

BACKGROUND

With smart wearable devices keep developing, a method for connecting the smart wearable devices and terminal devices is required to be simplified in order to improve operation convenience of users.

SUMMARY

According to a first aspect of an example of the disclosure, there is provided a connection method for a wireless smart wearable device. The connection method is performed by a terminal device and includes:
 receiving a connection switching instruction of the wireless smart wearable device from a preset control interface of the terminal device;
 determining a target device according to the connection switching instruction; and
 instructing, according to a preset parameter of the wireless smart wearable device, the target device to be connected with the wireless smart wearable device according to the preset parameter.

According to a second aspect of an example of the disclosure, there is provided a connection method for a wireless smart wearable device. The connection method is performed by a target device and includes:
 receiving a connection instruction for connection with the wireless smart wearable device, the connection instruction including a preset parameter;
 transmitting a connection request to the wireless smart wearable device according to the preset parameter; and
 receiving connection response information that is transmitted from the wireless smart wearable device and based on the connection request.

According to a third aspect of an example of the disclosure, there is provided a connection apparatus for a wireless smart wearable device. The connection apparatus includes:
 a processor, and
 a memory configured to store an instruction executable by the processor,
 where the processor is configured to execute the connection method for a wireless smart wearable device according to any one of the first aspect or the second aspect of the examples of the disclosure.

According to a fourth aspect of an example of the disclosure, there is provided a non-transitory computer-readable storage medium, when an instruction in the storage medium is executed by a processor of an apparatus, the apparatus may be caused to execute the connection method for a wireless smart wearable device according to any one of the first aspect or the second aspect of the examples of the disclosure.

It is to be understood that the above general description and the following detailed description are illustrative and explanatory, and cannot limit the disclosure.

BRIEF DESCRIPTION OF THE DRAWINGS

The drawings here are incorporated into the description as a constituent part of the description, illustrate examples conforming to the disclosure, and serve to explain principles of the disclosure along with the description.

DETAILED DESCRIPTION

The examples will be described in detail here and shown in the accompanying drawings illustratively. When the following descriptions relate to the accompanying drawings, unless otherwise specified, the same numeral in different accompanying drawings denotes the same or similar element. The implementations described in the following examples do not denote all implementations consistent with the disclosure. On the contrary, the implementations are examples of an apparatus and a method consistent with some aspects of the disclosure as detailed herein.

The disclosure relates to the technical field of smart wearable devices, and particularly relates to a connection method and apparatus for a wireless smart wearable device, and a storage medium.

In the related technologies, when a Bluetooth headset, for example, is being connected with a terminal device and needs to be switched to connect with another terminal device, it's common practice to re-execute a Bluetooth connection process between the Bluetooth headset and the another terminal device, that is, the Bluetooth headset has to be disconnected from a current terminal device, then Bluetooth search on the another terminal device is conducted, and a Bluetooth connection with the headset is manually set according to a search result. Such a connection switching process is complicated and can only be operated on another terminal device the connection is to be switched to, thus influencing user experience.

In an example of the disclosure, there is provided a connection method for a wireless smart wearable device.

Figure 1:
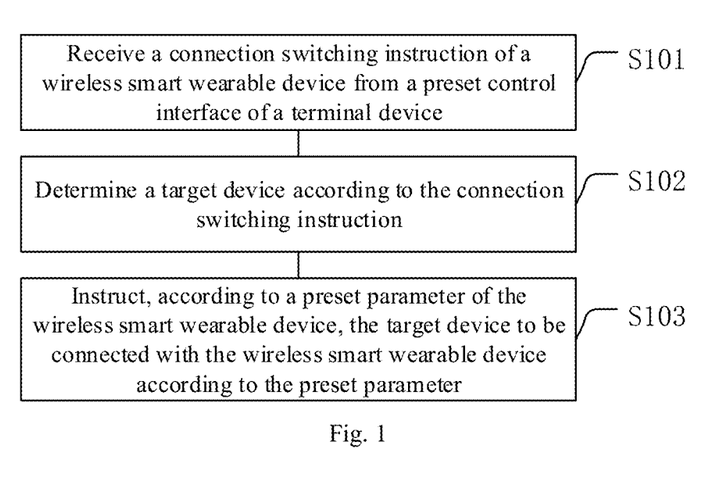
FIG. 1 is a flowchart of a connection method for a wireless smart wearable device according to an example.

The connection method is performed by terminal devices. The terminal devices include a smart phone, a tablet computer or other electronic devices having display screens. FIG. 1 is a flowchart of a connection method for a wireless smart wearable device according to an example. As shown in FIG. 1, the connection method includes the following steps:

S101, a connection switching instruction of the wireless smart wearable device is received from a preset control interface of a terminal device.

S102, a target device is determined according to the connection switching instruction.

S103, the target device is instructed, according to a preset parameter of the wireless smart wearable device, to be connected with the wireless smart wearable device according to the preset parameter.

In an example of the disclosure, in order to solve problems in the related technologies, there is provided a connection method for a wireless smart wearable device. The connection method is performed by a terminal device. A connection switching instruction of the wireless smart wearable device is received from a preset control interface of the terminal device, a target device the connection is to be switched to is determined according to the connection switching instruction, and according to a preset parameter of the wireless smart wearable device, the target device is instructed to be connected with the wireless smart wearable device according to the preset parameter. According to the connection method for a wireless smart wearable device in the disclosure, connection switching operations may be completed by means of the preset control interface on the terminal device. In this way, for users, a connection switching process of the wireless smart wearable device is simplified, and the connection switching operations of the wireless smart wearable device between other terminal devices may be controlled.

Figure 2:
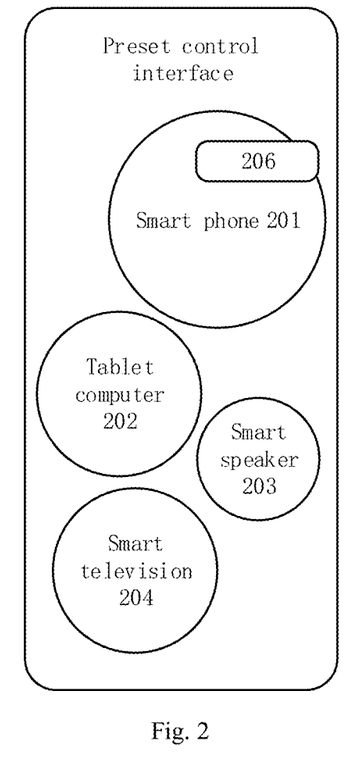
FIG. 2 illustratively shows a schematic diagram of a preset control interface of a terminal device that is not connected with a wireless smart wearable device.
Figure 3:
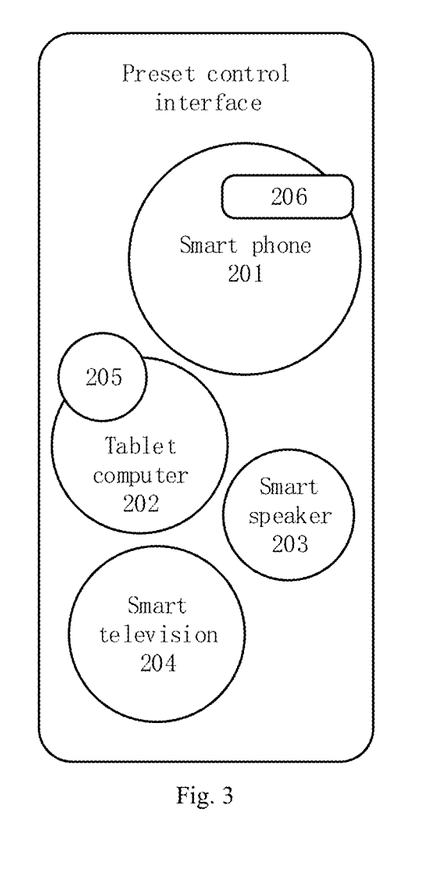
FIG. 3 illustratively shows a schematic diagram of a preset control interface of a terminal device that is connected with a wireless smart wearable device.

In S101, the wireless smart wearable devices include a Bluetooth headset, virtual reality (VR) glasses, augmented reality (AR) glasses or other smart wearable devices that may be connected with the terminal devices through wireless communication. The preset control interface of the terminal device may be any control interface that may display and mark a current device connected with the wireless smart wearable device and may display and control connection with a device to be connected. For example, devices in a current environment include a smart phone 201, a tablet computer 202, a smart speaker 203 and a smart television 204. An icon of the wireless smart wearable device is marked by icon 205. FIG. 2 and FIG. 3 illustratively show schematic diagrams of a preset control interface of a terminal device. In FIG. 2, there is no icon of the wireless smart wearable device, which indicates that none of the devices in the current environment are connected with the wireless smart wearable device, and icon 206 on the smart phone 201 indicates that the preset control interface is displayed on the smart phone 201. In FIG. 3, the icon 205 is on the tablet computer 202, which indicates that the wireless smart wearable device is connected with the tablet computer 202. The connection switching instruction may be any operation for a connectable device on the preset control interface, for example, may be an operation of clicking an icon of the target device on the preset control interface or dragging the icon of the wireless smart wearable device to the icon of the target device on the preset control interface.

In S102, the target device is a device the connection is to be switched to. For example, a current device connected with the wireless smart wearable device is a smart phone, and the wireless smart wearable device is to be connected with a tablet computer, the connection switching instruction is configured to control the wireless smart wearable device to be connected to the tablet computer from the smart phone, and the target device is the tablet computer. The target device is determined according to the connection switching instruction. For example, when the connection switching instruction is implemented by clicking the target device on the preset control interface, a clicked device is determined as the target device. When the connection switching instruction is implemented by dragging the icon of the wireless smart wearable device on the preset control interface, a corresponding device is determined as the target device when a dragging operation is finished, that is, when a finger leaves a screen.

In S103, the preset parameter of the wireless smart wearable device may be any parameter to enable the target device to be connected with the wireless smart wearable device according to the preset parameter. For example, the preset parameter is a media access control (MAC) address of the wireless smart wearable device. According to the preset parameter of the wireless smart wearable device, the target device is instructed to be connected with the wireless smart wearable device according to the preset parameter, such that the connection of the wireless smart wearable device is switched from the current device to the target device.

In an example of the disclosure, the connection switching instruction of the wireless smart wearable device is received from the preset control interface of the terminal device, the target device the connection is to be switched to is determined according to the connection switching instruction, and according to the preset parameter of the wireless smart wearable device, the target device is instructed to be connected with the wireless smart wearable device according to the preset parameter, such that a technical effect of the connection switching of the wireless smart wearable device with any connectable devices is achieved by means of the preset control interface, and a connection switching process of the wireless smart wearable device is simplified.

In an example of the disclosure, receiving the connection switching instruction of the wireless smart wearable device from the preset control interface of the terminal device includes: receiving an instruction of dragging the icon corresponding to the wireless smart wearable device to the icon of the target device on the preset control interface.

Figure 4:
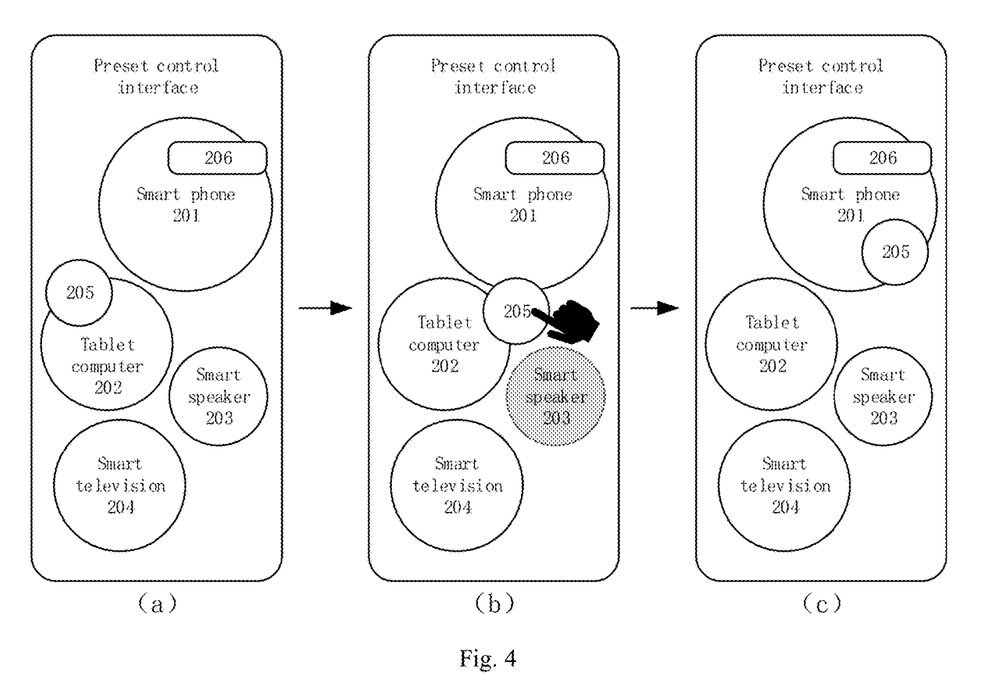
FIG. 4 illustratively shows an icon dragging process of a connection switching instruction.

The connection switching instruction is implemented by dragging the icon corresponding to the wireless smart wearable device. FIG. 4 illustratively shows an icon dragging process of a connection switching instruction. FIG. 4(a) shows a connection state of the wireless smart wearable device before the connection switching instruction is received, that is, a state when the tablet computer 202 that is a current device is connected with the wireless smart wearable device. FIG. 4(b) shows a state in a process of implementing the connection switching instruction, that is, a state in a process of dragging the icon corresponding to the wireless smart wearable device. FIG. 4(c) shows a connection state after the connection switching instruction is received, that is, a state when the smart phone 201 that is a target device is connected with the wireless smart wearable device after dragging is finished. It is to be noted that a device marked in gray in FIG. 4(b) indicates a device that does not support switching connection by means of the preset control interface, that is, the wireless smart wearable device cannot be connected with the smart speaker 203 by dragging an icon directly.

In an example of the disclosure, when instructing, according to the preset parameter of the wireless smart wearable device, the target device to be connected with the wireless smart wearable device according to the preset parameter, there are the following two conditions:

first, the target device is another terminal device. In the disclosure, the another terminal device refers to a terminal device other than the terminal device having the preset control interface. A connection instruction for connection with the wireless smart wearable device is transmitted to the target device, the connection instruction including the preset parameter, so as to enable the target device to be connected with the wireless smart wearable device according to the preset parameter.

In response to determining that the target device is another terminal device, the terminal device having the preset control interface transmits, after obtaining the preset parameter of the wireless smart wearable device, the connection instruction for connection with the wireless smart wearable device to the target device, the connection instruction including the preset parameter, so as to enable the target device to be connected with the wireless smart wearable device according to the preset parameter.

Figure 5:
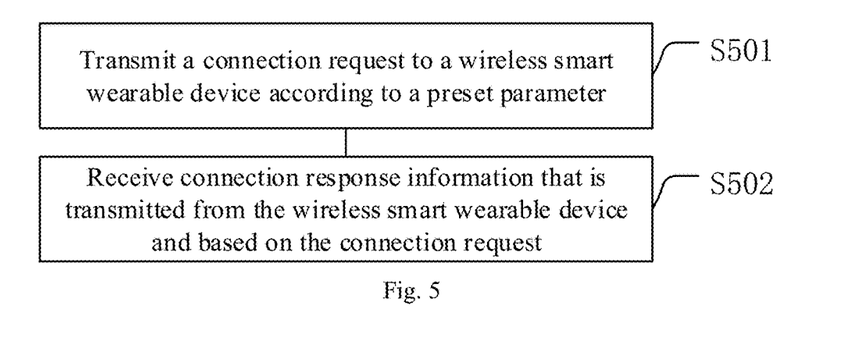
FIG. 5 is a flowchart of a method for connecting with a wireless smart wearable device according to an example.

Second, the target device is the terminal device having the preset control interface. FIG. 5 is a flowchart of a method for connecting with a wireless smart wearable device according to an example. As shown in FIG. 5, the method includes the following steps:

S501, a connection request is transmitted to the wireless smart wearable device according to the preset parameter.

S502, connection response information that is transmitted from the wireless smart wearable device and based on the connection request is received.

In response to determining that the target device is the terminal device having the preset control interface, that is, a connected current device is another terminal device, the terminal device having the preset control interface transmits, after obtaining the preset parameter of the wireless smart wearable device, the connection request to the wireless smart wearable device according to the preset parameter, and receives the connection response information that is transmitted from the wireless smart wearable device and based on the connection request, thus completing wireless connection according to the connection response information.

Figure 6:
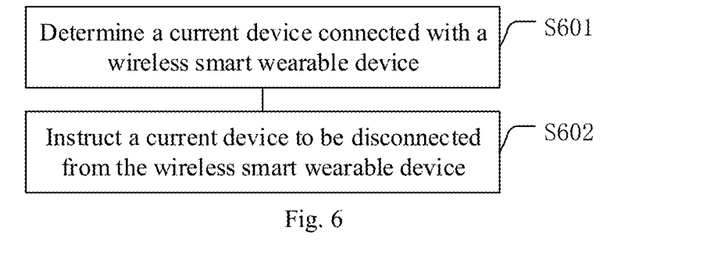
FIG. 6 is a flowchart of a method for connecting with a wireless smart wearable device according to an example.

In an example of the disclosure, FIG. 6 is a flowchart of a method for connecting with a wireless smart wearable device according to an example. As shown in FIG. 6, the method includes the following steps:

S601, a current device connected with the wireless smart wearable device is determined.

S602, the current device is instructed to be disconnected from the wireless smart wearable device.

Before the target device obtains the preset parameter of the wireless smart wearable device, the terminal device having the preset control interface determines the current device connected with the wireless smart wearable device, and instructs the current device to be disconnected from the wireless smart wearable device, thus preventing a connection conflict when the target device is connected with the wireless smart wearable device.

In an example, the terminal device transmits a disconnection instruction for disconnecting the current device connected with the wireless smart wearable device from the wireless smart wearable device to the current device, such that the current device is disconnected from the wireless smart wearable device, and a connection conflict does not occur when the terminal device is connected with the wireless smart wearable device according to the preset parameter.

In an example of the disclosure, a method for obtaining the preset parameter by the terminal device having the preset control interface may include obtaining the preset parameter of the wireless smart wearable device from the current device, or obtaining the preset parameter of the wireless smart wearable device from a mapping table between the wireless smart wearable device and the preset parameters which is stored in the terminal device.

Figure 7:
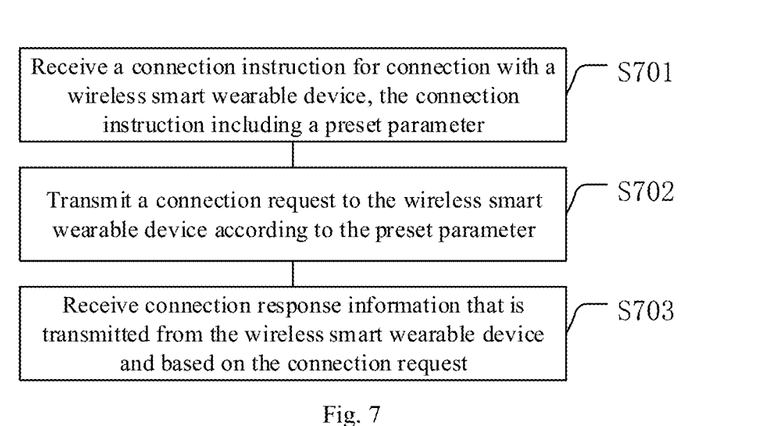
FIG. 7 is a flowchart of a connection method for a wireless smart wearable device according to an example.

In an example of the disclosure, there is provided a connection method for a wireless smart wearable device. The connection method is performed by a target device. The target device is a device the connection is to be switched to indicated by a connection switching instruction. FIG. 7 is a flowchart of a connection method for a wireless smart wearable device according to an example. As shown in FIG. 7, the connection method includes the following steps:

S701, a connection instruction for connection with the wireless smart wearable device is received, the connection instruction including a preset parameter.

S702, a connection request is transmitted to the wireless smart wearable device according to the preset parameter.

S703, connection response information that is transmitted from the wireless smart wearable device and based on the connection request is received.

The target device receives the connection instruction for connection with the wireless smart wearable device, the connection instruction including the preset parameter. The preset parameter indicates a parameter for wireless connection with the wireless smart wearable device. For example, the preset parameter includes an MAC address of the wireless smart wearable device. After obtaining the preset parameter of the wireless smart wearable device, the target device transmits the connection request to the wireless smart wearable device according to the preset parameter, and receives the connection response information that is transmitted from the wireless smart wearable device and based on the connection request, thus completing connection with the wireless smart wearable device on the basis of the connection response information.

In an example of the disclosure, the connection method further includes:

before the connection request is transmitted to the wireless smart wearable device, whether the target device is paired with the wireless smart wearable device is determined;

a pairing request is transmitted, in response to determining that the target device is not paired with the wireless smart wearable device, to the wireless smart wearable device according to the preset parameter; and a response message based on the pairing request is received from the wireless smart wearable device.

In order to ensure a connection success rate between the target device and the wireless smart wearable device, whether the target device is paired with the wireless smart wearable device is determined before transmitting the connection request to the wireless smart wearable device. When the target device is not paired with the wireless smart wearable device, connection cannot be directly conducted. Thus, according to the preset parameter, the pairing request is transmitted to the wireless smart wearable device, and the response message based on the pairing request is received from the wireless smart wearable device. After pairing is completed according to the response message, wireless connection is conducted. When the target device was paired with the wireless smart wearable device in the past, wireless connection may be directly conducted.

In an example of the disclosure, with a Bluetooth headset as the wireless smart wearable device for example, there are provided three cases of switching the connection of the Bluetooth headset and flowcharts of corresponding connection methods.

Figure 8:
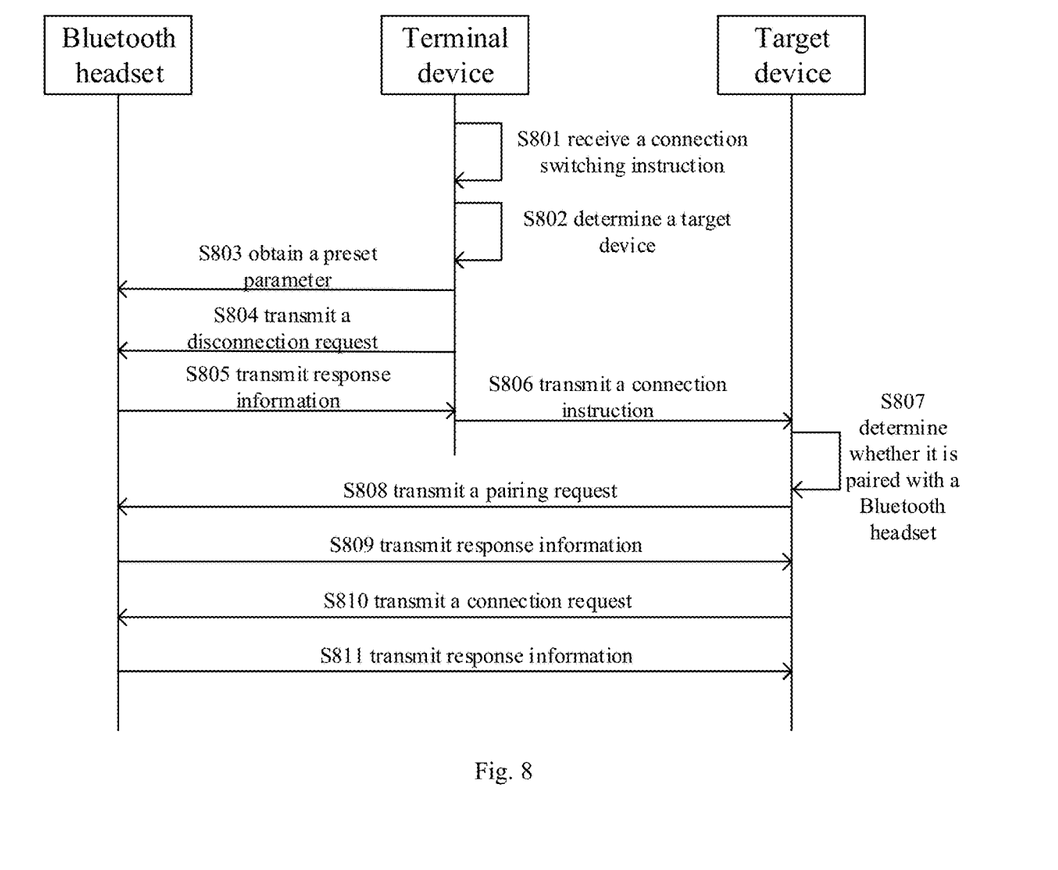
FIG. 8 is a flowchart of a connection method for a Bluetooth headset according to an example.

In a first case, a current device is a terminal device having the preset control interface, and a target device is another terminal device. FIG. 8 is a flowchart of a connection method for a Bluetooth headset according to an example. As shown in FIG. 8, the connection method includes the following steps:

S801, an instruction of dragging an icon corresponding to the Bluetooth headset to an icon of the target device is received from the preset control interface of the terminal device, that is, a connection switching instruction.

S802, the target device is determined according to the connection switching instruction.

S803, the terminal device obtains a preset parameter of the Bluetooth headset.

S804, the terminal device transmits a disconnection request to the Bluetooth headset.

S805, the Bluetooth headset transmits response information based on the disconnection request to the terminal device.

S806, the terminal device transmits a connection instruction for connection with the Bluetooth headset to the target device, the connection instruction including the preset parameter.

S807, the target device determines whether it is paired with the Bluetooth headset.

In response to determining that the target device is paired with the Bluetooth headset, S810-S811 are executed; and in response to determining that the target device is not paired with the Bluetooth headset, S808-S811 are executed.

S808, the target device transmits a pairing request to the Bluetooth headset according to the preset parameter.

S809, the Bluetooth headset transmits a response message based on the pairing request to the target device.

S810, the target device transmits a connection request to the Bluetooth headset according to the preset parameter.

S811, the Bluetooth headset transmits connection response information based on the connection request to the target device.

Figure 9:
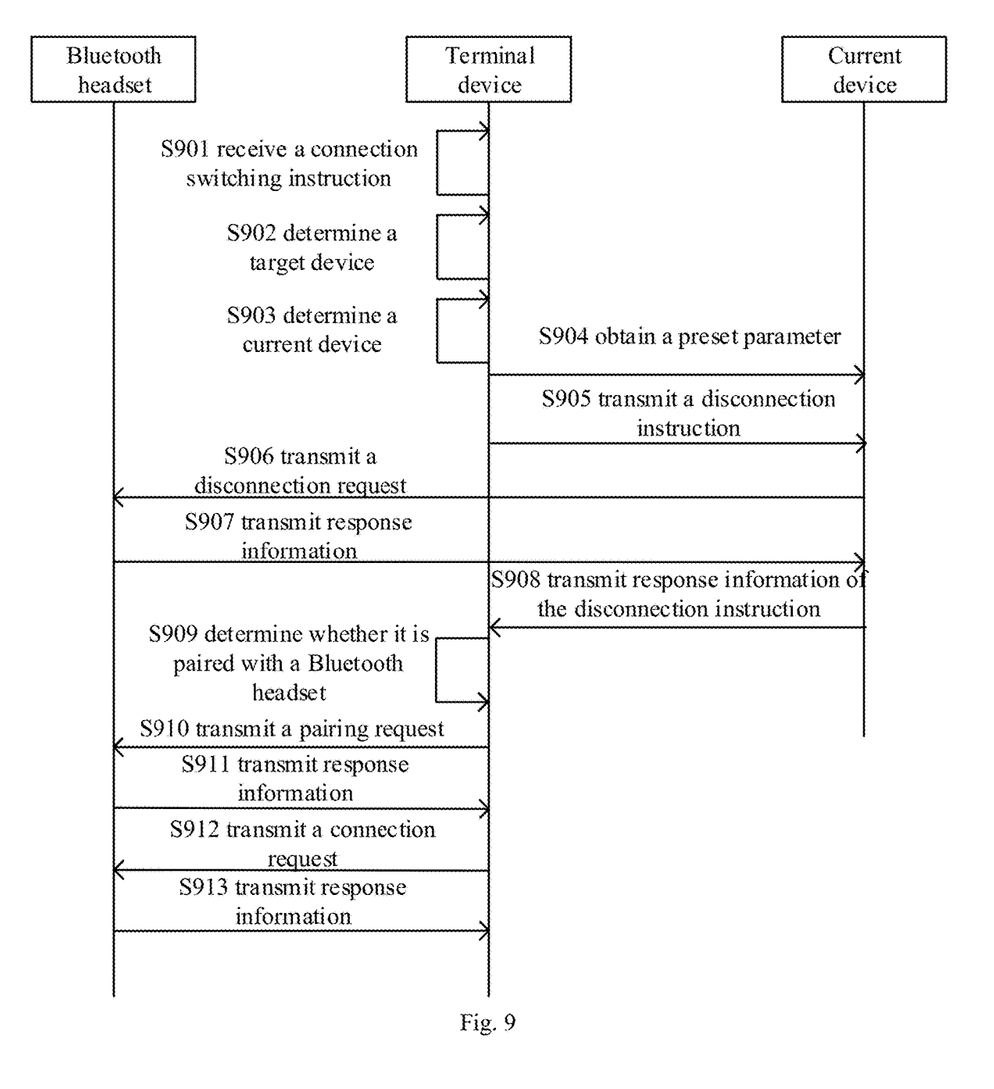
FIG. 9 is a flowchart of a connection method for a Bluetooth headset according to an example.

In a second case, a current device is another terminal device, and a target device is a terminal device having the preset control interface. FIG. 9 is a flowchart of a connection method for a Bluetooth headset according to an example. As shown in FIG. 9, the connection method includes the following steps:

S901, an instruction of dragging an icon corresponding to the Bluetooth headset to an icon of the target device is received from a preset control interface of the terminal device, that is, a connection switching instruction.

S902, the target device is determined according to the connection switching instruction.

S903, the current device connected with the Bluetooth headset is determined.

S904, the terminal device obtains a preset parameter of the Bluetooth headset from the current device.

S905, the terminal device transmits a disconnection instruction for disconnecting the current device connected with the Bluetooth headset from the Bluetooth headset to the current device.

S906, the current device transmits a disconnection request to the Bluetooth headset.

S907, the Bluetooth headset transmits response information based on the disconnection request to the current device.

S908, the current device transmits disconnection response information based on the disconnection instruction to the terminal device.

S909, the terminal device determines whether it is paired with the Bluetooth headset.

In response to determining that the terminal device is paired with the Bluetooth headset, S912-S913 are executed; and in response to determining that the terminal device is not paired with the Bluetooth headset, S910-S913 are executed.

S910, the terminal device transmits a pairing request to the Bluetooth headset according to the preset parameter.

S911, the Bluetooth headset transmits a response message based on the pairing request to the terminal device.

S912, the terminal device transmits a connection request to the Bluetooth headset according to the preset parameter.

S913, the terminal device transmits connection response information based on the connection request to the Bluetooth headset.

Figure 10:
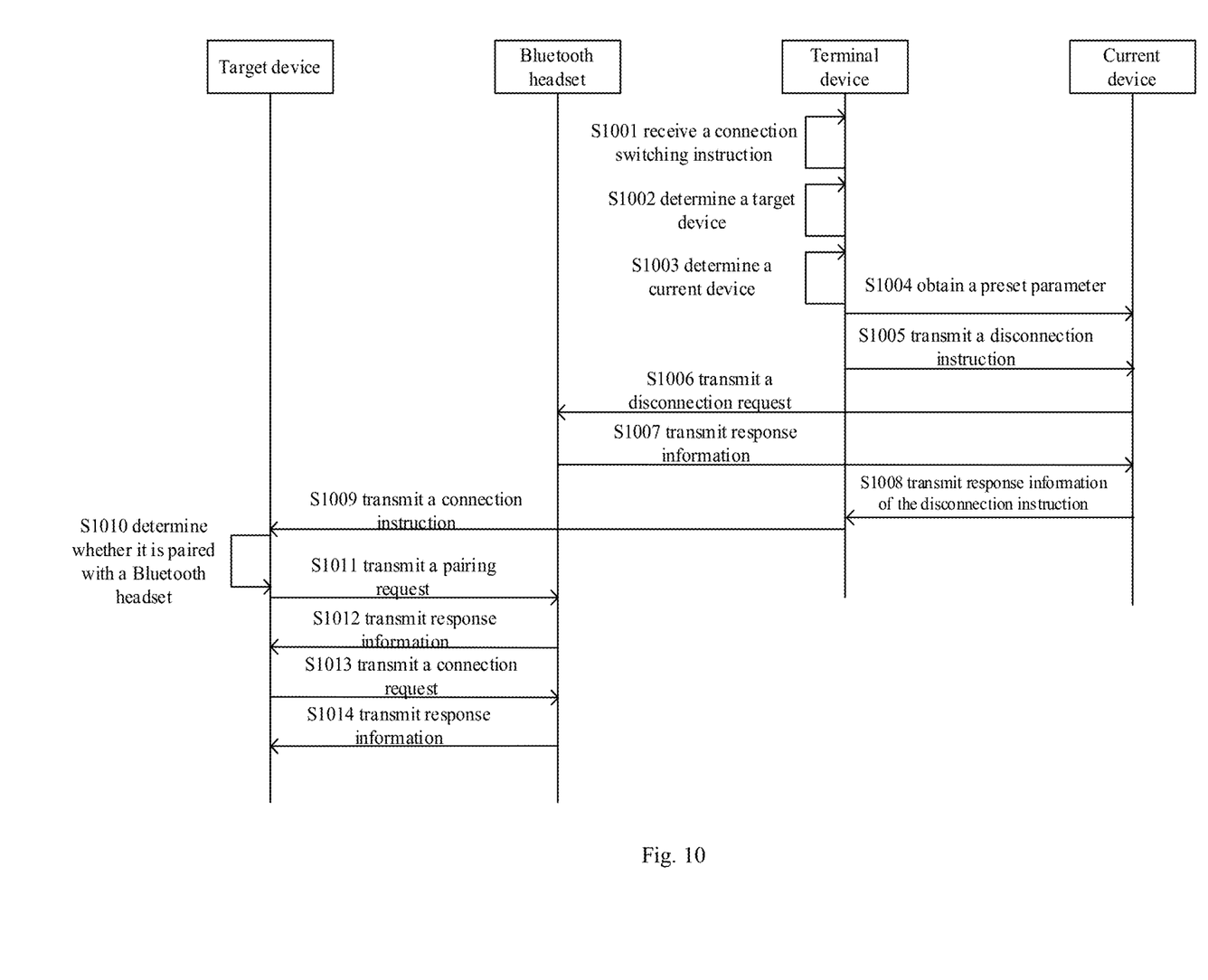
FIG. 10 is a flowchart of a connection method for a Bluetooth headset according to an example.

In a third case, a current device is another terminal device, and a target device is another terminal device. FIG. 10 is a flowchart of a connection method for a Bluetooth headset according to an example. As shown in FIG. 10, the connection method includes the following steps:

S1001, an instruction of dragging an icon corresponding to the Bluetooth headset to an icon of the target device is received from a preset control interface of the terminal device, that is, a connection switching instruction.

S1002, the target device is determined according to the connection switching instruction.

S1003, the current device connected with the Bluetooth headset is determined.

S1004, the terminal device obtains a preset parameter of the Bluetooth headset from the current device.

S1005, the terminal device transmits a disconnection instruction for disconnecting the current device connected with the Bluetooth headset from the Bluetooth headset to the current device.

S1006, the current device transmits a disconnection request to the Bluetooth headset.

S1007, the Bluetooth headset transmits response information based on the disconnection request to the current device.

S1008, the current device transmits disconnection response information based on the disconnection instruction to the terminal device.

S1009, the terminal device transmits a connection instruction for connection with the Bluetooth headset to the target device, the connection instruction including the preset parameter.

S1010, the target device determines whether it is paired with the Bluetooth headset.

In response to determining that the target device is paired with the Bluetooth headset, S1013-S1014 are executed; and in response to determining that the target device is not paired with the Bluetooth headset, S1011-S1014 are executed.

S1011, the target device transmits a pairing request to the Bluetooth headset according to the preset parameter.

S1012, the Bluetooth headset transmits a response message based on the pairing request to the target device.

S1013, the target device transmits a connection request to the Bluetooth headset according to the preset parameter.

S1014, the Bluetooth headset transmits connection response information based on the connection request to the target device.

Figure 11:
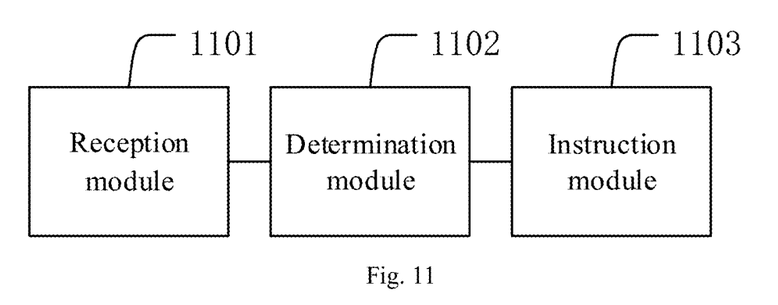
FIG. 11 is a block diagram of a connection apparatus for a wireless smart wearable device according to an example.

In an example of the disclosure, there is provided a connection apparatus for a wireless smart wearable device. The connection apparatus is suitable for a terminal device. FIG. 11 is a block diagram of a connection apparatus for a wireless smart wearable device according to an example. As shown in FIG. 11, the connection apparatus includes:

a reception module 1101 configured to receive a connection switching instruction of the wireless smart wearable device from a preset control interface of the terminal device;

a determination module 1102 configured to determine a target device according to the connection switching instruction; and an instruction module 1103 configured to instruct, according to a preset parameter of the wireless smart wearable device, the target device to be connected with the wireless smart wearable device according to the preset parameter.

In an example, the instruction module 1103 is further configured to:

transmit, in response to determining that the target device is another terminal device, a connection instruction for connection with the wireless smart wearable device to the target device, the connection instruction including the preset parameter, so as to enable the target device to be connected with the wireless smart wearable device according to the preset parameter.

In an example, the instruction module 1103 is further configured to:

transmit, in response to determining that the target device is the terminal device, a connection request to the wireless smart wearable device according to the preset parameter; and receive connection response information that is transmitted from the wireless smart wearable device and based on the connection request.

In an example, the determination module 1102 is further configured to determine a current device connected with the wireless smart wearable device; and the instruction module 1103 is further configured to instruct the current device to be disconnected from the wireless smart wearable device.

In an example, the instruction module 1103 is further configured to:

transmit, in response to determining that the current device is another terminal device, a disconnection instruction to the current device, so as to disconnect the current device from the wireless smart wearable device.

In an example, the instruction module 1103 is further configured to:

obtain the preset parameter of the wireless smart wearable device from the current device.

In an example, the reception module 1101 is further configured to:

receive an instruction of dragging an icon corresponding to the wireless smart wearable device to an icon of the target device on the preset control interface.

In an example, the preset parameter includes an MAC address of the wireless smart wearable device.

Figure 12:
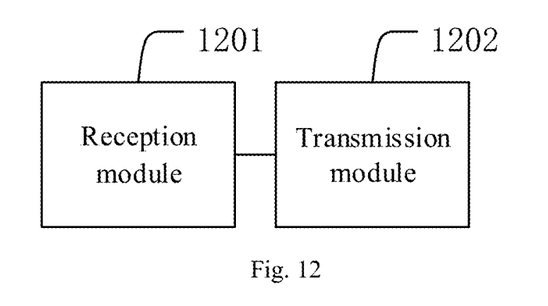
FIG. 12 is a block diagram of a connection apparatus for a wireless smart wearable device according to an example.

In an example of the disclosure, there is provided a connection apparatus for a wireless smart wearable device. The connection apparatus is suitable for a target device. FIG. 12 is a block diagram of a connection apparatus for a wireless smart wearable device according to an example. As shown in FIG. 12, the connection apparatus includes:

a reception module 1201 configured to receive a connection instruction for connection with the wireless smart wearable device, the connection instruction including a preset parameter; and a transmission module 1202 configured to transmit a connection request to the wireless smart wearable device according to the preset parameter; and the reception module 1201 is further configured to receive connection response information that is transmitted from the wireless smart wearable device and based on the connection request.

In an example, the transmission module 1202 is further configured to:

determine, before transmitting the connection request to the wireless smart wearable device, whether the target device is paired with the wireless smart wearable device; and transmit, in response to determining that the target device is not paired with the wireless smart wearable device, a pairing request to the wireless smart wearable device according to the preset parameter; and receive a response message based on the pairing request from the wireless smart wearable device.

In an example, the preset parameter includes an MAC address of the wireless smart wearable device.

For the apparatus in the examples described above, a specific method for each module to execute an operation has been described in detail in the examples relating to the method, and will not be repeated here.

Figure 13:
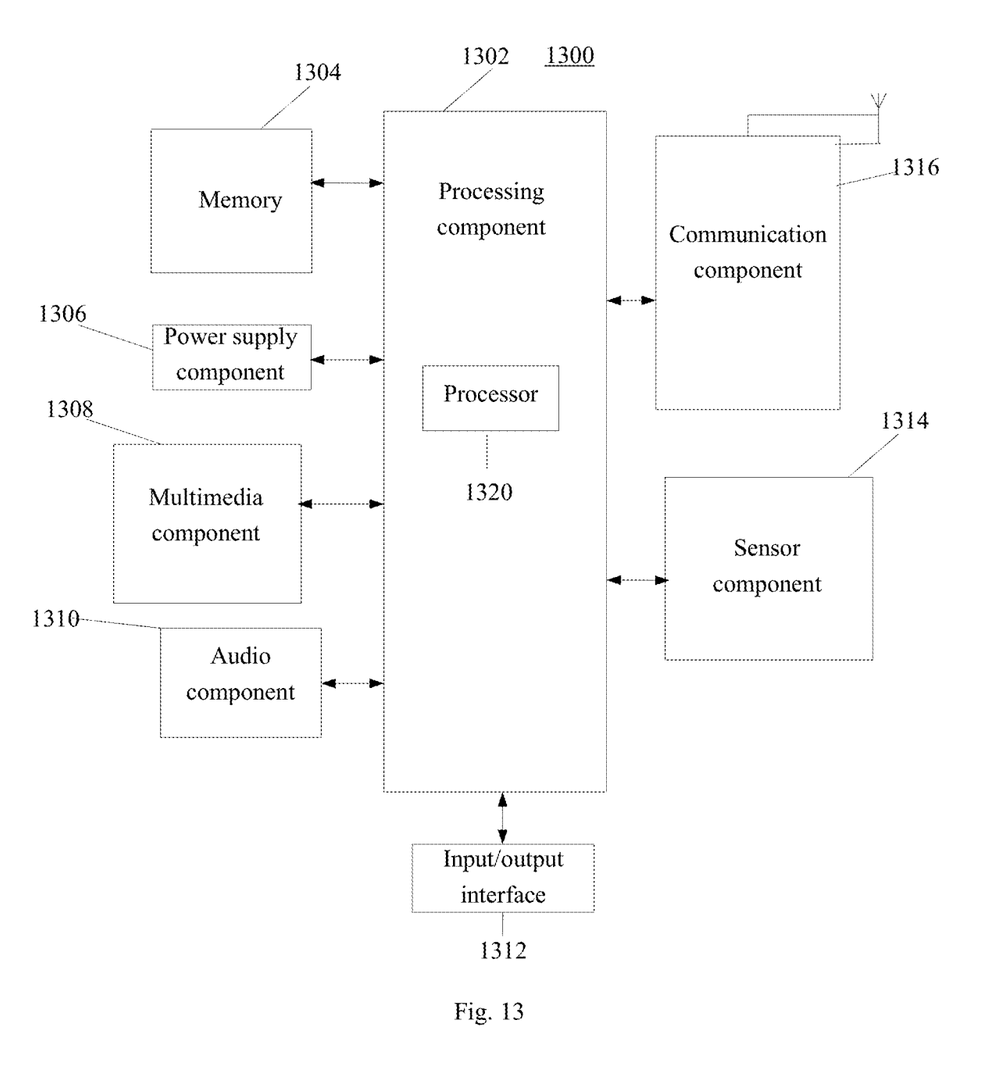
FIG. 13 is a block diagram of a connection apparatus for a wireless smart wearable device according to an example.

FIG. 13 is a block diagram of a connection apparatus 1300 for a wireless smart wearable device according to an example. The connection apparatus 1300 for a wireless smart wearable device may be the terminal device.

With reference to FIG. 13, the apparatus 1300 may include one or more of the following components: a processing component 1302, a memory 1304, a power supply component 1306, a multimedia component 1308, an audio component 1310, an input/output (I/O) interface 1312, a sensor component 1314, and a communication component 1316.

The processing component 1302 generally controls all operations of the apparatus 1300, such as operations associated with display, telephone call, data communication, camera operation and recording operation. The processing component 1302 may include one or more processors 1320 for executing an instruction, so as to complete all or part of the steps of the above-mentioned connection method for the wireless smart wearable device. In addition, the processing component 1302 may include one or more modules to facilitate interactions between the processing component 1302 and other components. For example, the processing component 1302 may include a multimedia module to facilitate an interaction between the multimedia component 1308 and the processing component 1302.

The memory 1304 is configured to store various types of data to support the operations on the apparatus 1300. Examples of the data include an instruction for any application program or method operating on the apparatus 1300, contact data, phone book data, a message, a picture, a video, etc. The memory 1304 may be implemented by any type of volatile or nonvolatile memory device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The power supply component 1306 supplies power to various components of the apparatus 1300. The power supply component 1306 may include a power management system, one or more power supplies, and other components associated with generating, managing and distributing power for the apparatus 1300.

The multimedia component 1308 includes a screen that provides an output interface between the apparatus 1300 and a user. In some examples, the screen may include a liquid crystal display (LCD) and a touch panel (TP). When the screen includes the touch panel, the screen may be implemented as a touch screen to receive an input signal from the user. The touch panel includes one or more touch sensors to sense touching, sliding and gestures on the touch panel. The touch sensor may sense a boundary of a touching or sliding operation, and detect a duration and pressure related to the touching or sliding operation. In some examples, the multimedia component 1308 includes a front camera and/or a back camera. When the apparatus 1300 is in an operation mode, such as a shooting mode or a video mode, the front camera and/or the back camera are/is capable of receiving external multimedia data. Each of the front camera and the back camera may be a fixed optical lens system or have a focal length and optical zoom capability.

The audio component 1310 is configured to output and/or input an audio signal. For example, the audio component 1310 includes a microphone (MIC). The microphone is configured to receive an external audio signal when the apparatus 1300 is in operation modes such as a call mode, a recording mode and a speech identification mode. The received audio signal may be further stored in the memory 1304 or transmitted via the communication component 1316. In some examples, the audio component 1310 further includes a speaker for outputting an audio signal.

The I/O interface 1312 provides an interface between the processing component 1302 and a peripheral interface module. The peripheral interface module may be a keyboard, a click wheel, a button, etc. The buttons may include, but are not limited to, a home button, a volume button, a start button and a lock button.

The sensor component 1314 includes one or more sensors for providing various aspects of state assessment for the apparatus 1300. For example, the sensor component 1314 is capable of detecting an on/off state of the apparatus 1300 and relative positioning of the components such as a display and a keypad of the apparatus 1300, and the sensor component 1314 is further capable of detecting position change of the apparatus 1300 or an component of the apparatus 1300, presence or absence of contact between the user and the apparatus 1300, an orientation or acceleration/deceleration of the apparatus 1300 and temperature change of the apparatus 1300. The sensor component 1314 may include a proximity sensor configured to detect presence of a nearby object without any physical contact. The sensor component 1314 may further include an optical sensor, such as a complementary metal-oxide-semiconductor (CMOS) or charge-coupled device (CCD) image sensor, which is used in imaging applications. In some examples, the sensor component 1314 may further include an acceleration sensor, a gyroscope sensor, a magnetic sensor, a pressure sensor or a temperature sensor.

The communication component 1316 is configured to facilitate wired or wireless communication between the apparatus 1300 and other devices. The apparatus 1300 may access a wireless network based on a communication standard, such as WiFi, the 2nd generation mobile communication technology (2G) or the 3rd generation mobile communication technology (3G), or their combination. In an example, the communication component 1316 receives a broadcast signal or broadcast related information from an external broadcast management system via a broadcast channel. In an example, the communication component 1316 further includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology or other technologies.

In an example, the apparatus 1300 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic components, thus executing the above-mentioned connection method for the wireless smart wearable device.

In an example, there is further provided a non-transitory computer-readable storage medium including an instruction, such as the memory 1304 including an instruction. The instruction may be executed by the processor 1320 of the apparatus 1300 so as to complete the above-mentioned connection method for the wireless smart wearable device. For example, the non-transitory computer-readable storage medium may be ROM, a random access memory (RAM), CD-ROM, a magnetic tape, a floppy disk, an optical data storage device, etc.

A non-transitory computer-readable storage medium is provided. When an instruction in the storage medium is executed by a processor of an apparatus, the apparatus may be caused to execute the connection method for a wireless smart wearable device. The method includes any one of the above-mentioned methods.

Those skilled in the art could easily conceive of other implementation solutions of the disclosure upon consideration of the description and practice of the disclosure disclosed here. The disclosure is intended to cover any variations, uses or adaptive changes of the disclosure, and these variations, uses or adaptive changes follow the general principles of the disclosure and include common general knowledge or conventional technical means that is not disclosed in the art. The description and the examples are to be regarded as merely illustrative, and the true scope and spirit of the disclosure are indicated by the following claims.

It is to be understood that the disclosure is not limited to a precise structure which has been described above and illustrated in the accompanying drawings, and can be modified or changed in various ways without departing from the scope. The scope of the disclosure is limited merely by the appended claims.

The invention claimed is:

1. A connection method for a wireless smart wearable device, performed by a terminal device and comprising:
receiving a connection switching instruction of the wireless smart wearable device from a preset control interface of the terminal device in a case where the wireless smart wearable device is in a state of being connected with a current device;

determining a target device according to the connection switching instruction;

instructing, according to a preset parameter of the wireless smart wearable device, the target device to be connected with the wireless smart wearable device according to the preset parameter; and instructing the current device to be disconnected from the wireless smart wearable device.

2. The connection method for the wireless smart wearable device according to claim 1, wherein instructing, according to the preset parameter of the wireless smart wearable device, the target device to be connected with the wireless smart wearable device according to the preset parameter comprises:

in response to determining that the target device is another terminal device, transmitting a connection instruction for connection with the wireless smart wearable device to the target device, the connection instruction comprising the preset parameter, so as to enable the target device to be connected with the wireless smart wearable device according to the preset parameter.

3. The connection method for the wireless smart wearable device according to claim 1, wherein instructing, according to the preset parameter of the wireless smart wearable device, the target device to be connected with the wireless smart wearable device according to the preset parameter comprises:

in response to determining that the target device is the terminal device, transmitting a connection request to the wireless smart wearable device according to the preset parameter; and receiving connection response information that is transmitted from the wireless smart wearable device and based on the connection request.

4. The connection method for the wireless smart wearable device according to claim 1, further comprising:

determining the current device connected with the wireless smart wearable device.

5. The connection method for the wireless smart wearable device according to claim 4, further comprising:

in response to determining that the current device is another terminal device, transmitting a disconnection instruction to the current device, so as to disconnect the current device from the wireless smart wearable device.

6. The connection method for the wireless smart wearable device according to claim 5, further comprising:

obtaining the preset parameter of the wireless smart wearable device from the current device.

7. The connection method for the wireless smart wearable device according to claim 1, wherein receiving the connection switching instruction of the wireless smart wearable device from the preset control interface of the terminal device comprises:

receiving an instruction of dragging an icon corresponding to the wireless smart wearable device to an icon of the target device on the preset control interface, wherein icons displayed on the preset control interface comprises an icon of a device that does not support switching connection via the preset control interface.

8. The connection method for the wireless smart wearable device according to claim 1, wherein the preset parameter comprises a media access control (MAC) address of the wireless smart wearable device.

9. A connection method for a wireless smart wearable device, performed by a target device and comprising:

receiving a connection instruction for connection with the wireless smart wearable device in a case where a terminal device receives a connection switching instruction of the wireless smart wearable device, determines the target device according to the connection switching instruction, and instructs, according to a preset parameter of the wireless smart wearable device, the target device to be connected with the wireless smart wearable device according to the preset parameter, wherein the connection instruction comprises the preset parameter, and the connection switching instruction is received from a preset control interface of the terminal device in a case where the wireless smart wearable device is in a state of being connected with a current device;

transmitting a connection request to the wireless smart wearable device according to the preset parameter; and receiving connection response information that is transmitted from the wireless smart wearable device and based on the connection request.

10. The connection method for the wireless smart wearable device according to claim 9, further comprising:

determining, before transmitting the connection request to the wireless smart wearable device, whether the target device is paired with the wireless smart wearable device; and in response to determining that the target device is not paired with the wireless smart wearable device, transmitting a pairing request to the wireless smart wearable device according to the preset parameter; and receiving a response message based on the pairing request from the wireless smart wearable device.

11. The connection method for the wireless smart wearable device according to claim 9, wherein the preset parameter comprises an MAC address of the wireless smart wearable device.

12. A connection apparatus for a wireless smart wearable device, comprising:

a processor, and a memory configured to store an instruction executable by the processor, wherein the processor is configured to:

receive a connection switching instruction of the wireless smart wearable device from a preset control interface of a terminal device in a case where the wireless smart wearable device is in a state of being connected with a current device;

determine a target device according to the connection switching instruction;

instruct, according to a preset parameter of the wireless smart wearable device, the target device to be connected with the wireless smart wearable device according to the preset parameter; and instruct the current device to be disconnected from the wireless smart wearable device.

13. The connection apparatus for the wireless smart wearable device according to claim 12, wherein the processor is further configured to:

transmit, in response to determining that the target device is another terminal device, a connection instruction for connection with the wireless smart wearable device to the target device, the connection instruction comprising the preset parameter, so as to enable the target device to be connected with the wireless smart wearable device according to the preset parameter.

14. The connection apparatus for the wireless smart wearable device according to claim 12, wherein the processor is further configured to:

transmit, in response to determining that the target device is the terminal device, a connection request to the wireless smart wearable device according to the preset parameter; and receive connection response information that is transmitted from the wireless smart wearable device and based on the connection request.

15. The connection apparatus for the wireless smart wearable device according to claim 12, wherein the processor is further configured to:

determine the current device connected with the wireless smart wearable device.

16. The connection apparatus for the wireless smart wearable device according to claim 12, wherein the processor is further configured to:

receive an instruction of dragging an icon corresponding to the wireless smart wearable device to an icon of the target device on the preset control interface.

17. The connection apparatus for the wireless smart wearable device according to claim 16, wherein the processor is further configured to:

transmit, in response to determining that a current device is another terminal device, a disconnection instruction to the current device, so as to disconnect the current device from the wireless smart wearable device.

18. A connection apparatus, comprising:

a processor, and a memory configured to store an instruction executable by the processor, wherein the processor is configured to execute the connection method for a wireless smart wearable device according to claim 9.

19. A non-transitory computer-readable storage medium, wherein when an instruction in the storage medium is executed by a processor of an apparatus, the apparatus is caused to execute the connection method for a wireless smart wearable device according to claim 1.

20. A non-transitory computer-readable storage medium, wherein when an instruction in the storage medium is executed by a processor of an apparatus, the apparatus is caused to execute the connection method for a wireless smart wearable device according to claim 9.

\* \* \* \* \*